Patented Sept. 7, 1943

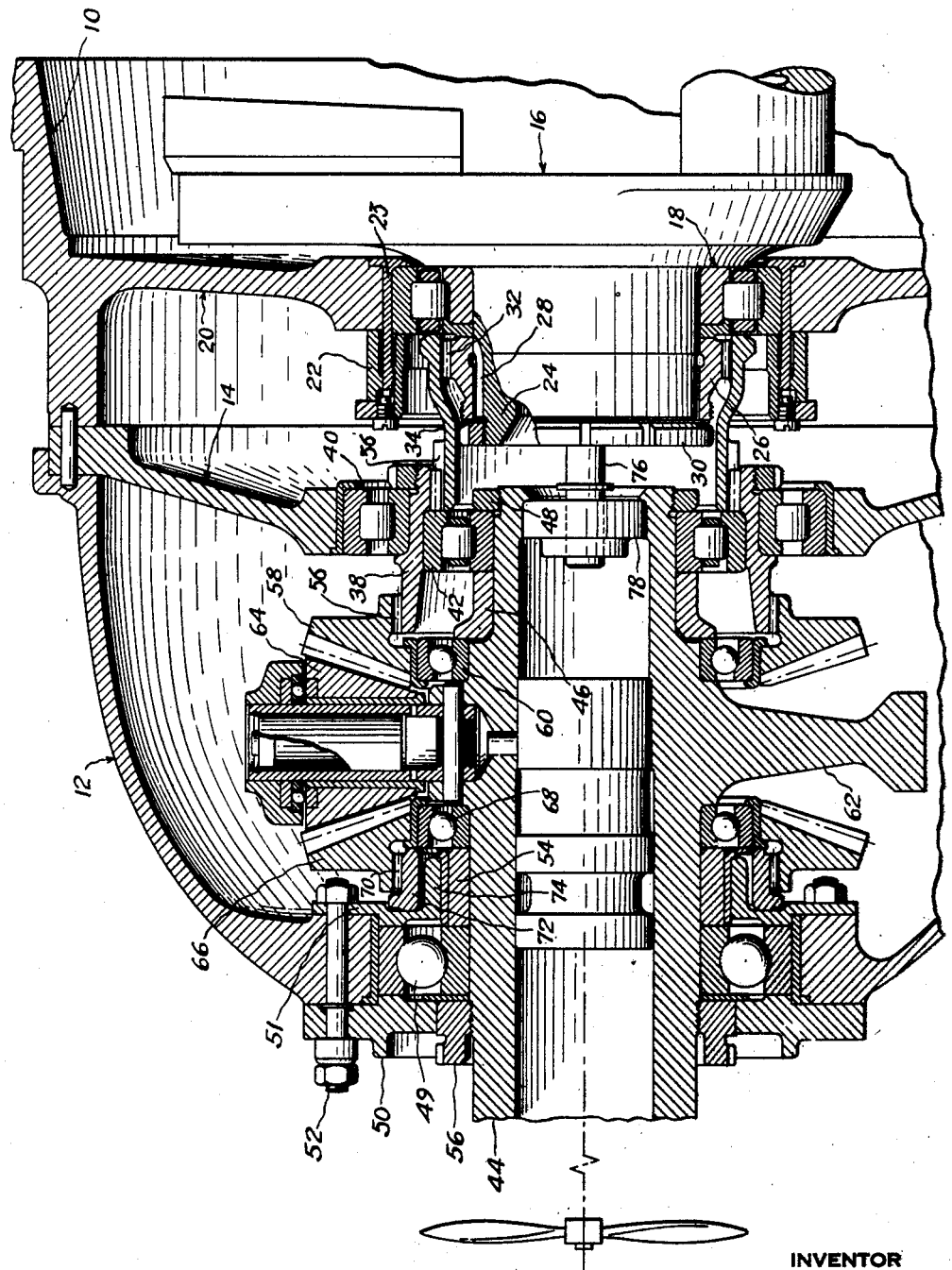

2,328,576

UNITED STATES PATENT OFFICE 2,328,576

PROPELLER SHAFT CONNECTION

Phillip P. Newcomb, Manchester, Conn., assignor to United Aircraft Corporation, East Hartford, Conn., a corporation of Delaware Application December 14, 1940, Serial No. 370,158

2 Claims. (Cl. 74—303)

This invention relates to improved propeller supporting and driving mechanism and has particular reference to an improved reduction gear mechanism incorporated between a propeller and a propeller driving engine.

An object of the invention resides in the provision of an improved reduction gear mechanism of the character indicated in which the propeller shaft is supported independently of the engine crankshaft and has only a torsional connection with the crankshaft.

A further object resides in the provision of an improved propeller drive gear mechanism of the character indicated in which the propeller shaft is completely isolated from all bending and eccentric movements of the engine crankshaft.

Other objects and advantages will be more particularly pointed out hereinafter or will become apparent as the description proceeds.

In the accompanying drawing, in which like reference numerals are used to designate similar parts throughout, there is illustrated a suitable constructional arrangement for the purpose of disclosing the invention. The drawing, however, is for the purpose of illustration only and is not to be taken as limiting or restricting the invention since it will be apparent to those skilled in the art that various changes in the illustrated construction may be resorted to without in any way exceeding the scope of the invention.

In the drawing, the single figure is a longitudinal sectional view through the front or nose section of an aircraft engine showing fragmentary portions of the engine crankshaft and the propeller shaft and a driving connection therebetween.

Referring to the drawing in detail, the numeral 10 generally indicates an engine crankcase the forward portion only of which is shown in the drawing. A gear housing or nosepiece generally indicated at 12 is attached to the front end of the crankcase and between the crankcase and the housing there is disposed a transverse bearing supporting partition 14. The engine crankshaft 16 is rotatably supported in an anti-friction bearing 18 mounted in a second transverse partition 20 positioned rearwardly of the partition 14 and preferably formed integrally with the crankcase 10 to provide a forward wall for the crankcase. An annular valve cam support 22 is carried by the partition 20 surrounding the bearing 18 and serves to clamp the bearing in operative position in the supporting partition.

Up to the present no adequate means has been devised for maintaining the bearing 18 absolutely tight in the supporting structure 20 when the engine heats up and the member 20 expands incidentally increasing the size of the bearing receiving aperture in this member. The member 23 can be maintained tight upon the bearing by providing an original shrink fit between the member and the outer bearing race or cam, or as is more often the case, be maintained solid with the member 20 by providing an original shrink fit between the members 20 and 23. In either case, heat expansion of the member 20 will permit a considerable radial movement of the bearing 18 with a consequent eccentric or wobbling motion of the bearing supported end of the crankshaft 16 and it is among the objects of this invention to avoid transmitting this wobbling movement of the crankshaft to the adjacent end of the propeller shaft.

The crankshaft 16 projects beyond the bearing 18 as indicated at 24 and carries on the projecting portion an annular collar 26 held against rotation relative to the crankshaft by suitable means such as the spline teeth 28 and retained in operative position thereon by suitable means such as the screw threaded annular abutment 30. This collar is provided with external teeth 32 which mesh with the corresponding internal teeth at one end of an annular driving member 34 the opposite end of which is provided with external teeth 36 meshing with internal teeth provided in the adjacent end of a second annular drive member 38 firmly supported in an annular anti-friction bearing 40 carried by the bearing supporting partition 14. Within the member 38 there is an annular anti-friction bearing 42 which supports the rear or inboard end of the propeller shaft 44. This bearing is secured in place on the propeller shaft by suitable annular abutment members 46 and 48, the member 48 being screw threaded onto the rearward end of the shaft. With this arrangement the rearward end of the propeller shaft 44 is supported by the bearing 42 through the annular member 38, the bearing 40 and the transverse bearing support 14. The front end of the propeller shaft is supported by the main outboard bearing 49 clamped in the forward end of the casing 12 by the annular cover plates 50 and 51 held in position by suitable means such as the through bolts, one of which is indicated at 52. The bearing 49 is secured in operative position on the shaft 44 by the annular abutments 54 and 56, the abutment 56 being screw threaded onto the forward end of the shaft. This arrangement obviates the usual supporting bearing, generally a plain bearing, between the adjacent ends of the crankshaft and the propeller shaft through which the eccentric movements of the crankshaft and ordinarily transmitted to the crankshaft end of the propeller shaft, and at the same time provides an adequate and firm support for the propeller shaft while eliminating at least one order of vibration from engine operation.

The annular drive member 38 is provided at its forward end with spline teeth 56 which engage with a limited freedom of relative movement with internal spline teeth provided in an annular beveled gear 58 operatively supported on the shaft 44 by an anti-friction bearing 60 held in position by an annular shoulder on the cage 62, formed integrally with the shaft 44, and the abutment 46. A plurality of beveled planet gears, one of which is indicated at 64, are carried by the cage 62 and mesh with the beveled ring gear 58 and with an annular beveled reaction gear 66 supported on the shaft 44 by an annular anti-friction bearing 68 clamped between the cage 62 and the abutment 54. The reaction gear 66 is provided with internal spline teeth which mesh with the external spline teeth 70 of an annular connecting member 72 having internal spline teeth which mesh with corresponding spline teeth formed on an annular flange 74 of the internal cover plate 51.

The splines at the opposite ends of the coupling member 34 have an intentionally loose fit with the corresponding splines on the members 26 and 38 so that the member 34 has a considerable degree of freedom of angular movement and in effect comprises a universal joint of limited angular deflection interposed between the crankshaft and the propeller shaft.

Lubricating oil may be transferred from the crankshaft 16 to the propeller shaft 44 through a suitable oil conduit 76 having a flexible connection 78 with the rearward end of the propeller shaft 44.

With this arrangement the crankshaft 16 is supported in the crankcase 10 and the propeller shaft 44 is supported, independently of the crankshaft, by the members 12 and 14. A torsional connection between the crankshaft and the drive shaft is provided by the free fit splines of the annular driving members 34 and 38 and the gears 58, 64 and 66. The propeller shaft is isolated from all other than rotational movements of the crankshaft by the firmly supported driving member 38 and eccentric movement of the crankshaft relative to the member 38 is permitted by the annular driving connection 34 which maintains the torsional driving connection while permitting the above mentioned eccentric movement of the crankshaft relative to the member 38 and shaft 44 to take place.

There is thus provided a driving connection between an engine crankshaft and an engine supported propeller shaft which transmits only torsional forces between the crankshaft and the propeller shaft and isolates the propeller shaft from all other than rotational movements of the crankshaft.

While a suitable mechanical embodiment has been illustrated in the accompanying drawing and hereinabove described for the purpose of disclosing the invention, it is to be understood that the invention is not limited to the particular embodiment so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In an engine having a crankshaft and a driven shaft, means supporting said crankshaft, means supporting said driven shaft entirely out of contact with said crankshaft, and means providing a torsional driving connection between said crankshaft and said driven shaft, said connecting means including a planetary reduction gear train carried by said driven shaft, an annular element supported by and extending on opposite sides of one of the supports for said driven shaft and splined to a ring gear of said planetary gear train and an annular connecting member torsionally connected at one end to said crankshaft by a spline connection and at its opposite end to said element by a spline connection and having freedom of angular movement relative to both said crankshaft and said element.

2. In an engine having a casing, a crankshaft and a driven shaft, casing carried means supporting said crankshaft, means for supporting said driven shaft entirely out of contact with said crankshaft, and means providing a torsional driving connection between said crankshaft and said driven shaft, said supporting means comprising at least two spaced apart annular bearings supported by the casing of said engine, and said driving connection comprising a reduction gear train mounted on said driven shaft between said supporting bearings and a pair of interconnected annular driving members torsionally connected with said gear train and with said crankshaft and extending past one of said bearings.

PHILIP P. NEWCOMB.